United States Patent [19]

Beaulieu et al.

[11] Patent Number: 4,861,283
[45] Date of Patent: Aug. 29, 1989

[54] DISTRIBUTION FRAMES AND ELECTRICAL CONNECTORS

[75] Inventors: Laurence A. J. Beaulieu, Kanata; Alex G. Cristescu, Montreal, both of Canada

[73] Assignee: Northern Telecom Limited, Montreal, Canada

[21] Appl. No.: 18,234

[22] Filed: Feb. 24, 1987

Related U.S. Application Data

[63] Continuation-in-part of Ser. No. 856,517, Apr. 28, 1986, abandoned.

[51] Int. Cl.⁴ ............................................. H01R 13/60
[52] U.S. Cl. ................................... 439/540; 439/372; 439/709
[58] Field of Search ............... 439/371, 372, 540, 544, 439/569, 570, 572, 574, 575, 709, 712, 715, 717, 719, 638–640, 651, 652, 653, 654, 676, 571

[56] References Cited

U.S. PATENT DOCUMENTS

| | | | |
|---|---|---|---|
| 3,017,598 | 1/1962 | Low | 439/371 |
| 3,986,764 | 10/1976 | Torburn | 439/372 |
| 4,037,910 | 7/1977 | Paluch | 439/719 |
| 4,131,330 | 12/1978 | Stupay | 439/540 |
| 4,165,142 | 8/1979 | Grabau | 439/372 |
| 4,220,391 | 9/1980 | Krolak et al. | 439/638 |
| 4,290,664 | 9/1981 | Davis et al. | 439/638 |
| 4,353,614 | 10/1982 | Etchison et al. | 439/540 |
| 4,392,701 | 7/1983 | Weidler | 439/638 |
| 4,753,610 | 6/1988 | Eason et al. | 439/571 |

Primary Examiner—David Pirlot
Attorney, Agent, or Firm—R. J. Austin

[57] ABSTRACT

A distribution frame having regions for mounting cross-connect connectors and multiple contact connectors. A cross-connect connector for mounting in the frame may be pre-assembled with conductor wires and a multiple contact connector.

3 Claims, 8 Drawing Sheets

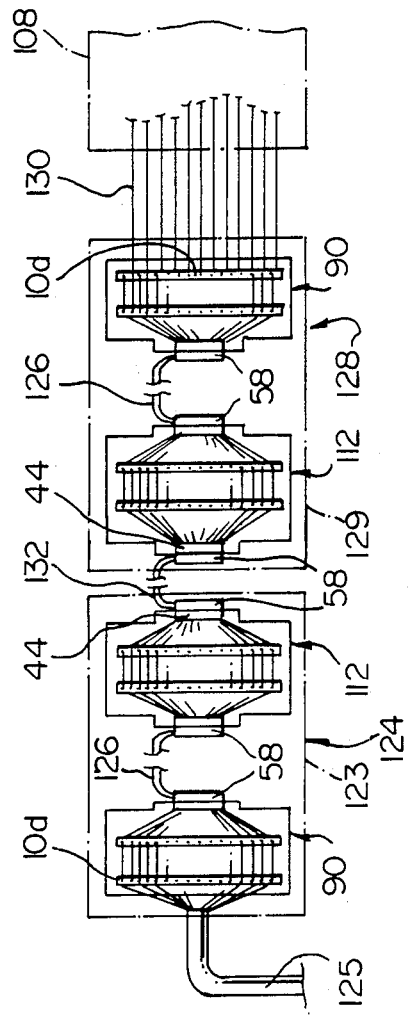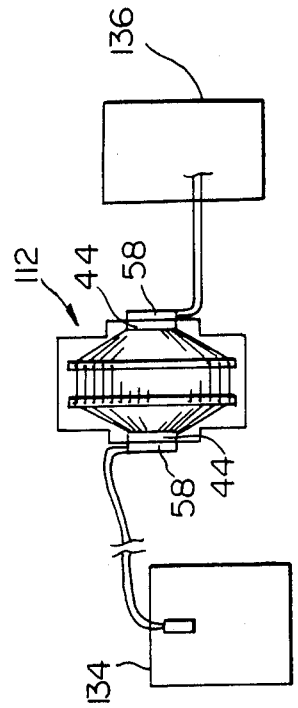

DISTRIBUTION FRAMES AND ELECTRICAL CONNECTORS

The present application is a continuation in part of application Ser. No. 856,517 filed Apr. 28, 1986, now abandoned.

This invention relates to distribution frames.

In a telecommunications system, an incoming cable to a customer's premises is connected to a distribution cable of the customer's private network for distribution of the electrical wiring to access points and terminals within the premises. The distribution cable may itself be connected to a further cable or to in series or in parallel cables, to assist in the wiring distribution. At each connection location between cables, it is now common practice to use a wiring distribution frame which detachably carries connectors for electrically connecting the conductor wires of one cable with those of another or others. The distribution frame may be of the construction of a frame referred to as a "module" in U.S. Pat. No. 4,278,315, granted July 14, 1981 and entitled "System for Interconnection of Multiple Insulated Wires" in the name of B. T. Osborne. These connectors are normally of a construction referred to as "cross-connect connectors" in that each connector comprises a dielectric body with two spaced rows of electrical terminals held by the body. The terminals of one row are interconnected electrically and in desired fashion with those of the other row through the dielectric body. The construction of cross-connect connectors may be that referred to as "connector blocks" in U.S. Pat. No. 4,295,703, granted Oct. 20, 1981 and entitled "Connector Block" in the name of B. T. Osborne.

According to a normal practice, at each distribution frame, an incoming cable is brought into an input location of the frame and its conductor wires are distributed as required to the various positions for mounting the cross-connect connectors. Each connector is then connected to its associated wires of the incoming cable with the connector mounted in the frame. The wires of the incoming cable are connected with the connector mounted in a position reversed from its operational position to allow these wires to be joined to terminals along one row. The connector is then removed and reinserted in its correct operational position to allow conductor wires of an outgoing cable to be connected to terminals of the other row. The whole of the connection procedure is manual and is an arduous and lengthy process particularly as there may be as many as twenty-five terminals along each row of a connector and some distribution frames hold ten or more connectors. The finished assembly of wires of an incoming cable and an outgoing cable is described in U.S. Pat. No. 4,278,315, referred to above. After the connection procedure, the completed circuitry is tested to ensure that electrical current passes from the ingoing cable to the desired wire of the outgoing cable. This test procedure involves forming electrical test circuits through the wiring and terminals at the connectors and also along at least one incoming or outgoing cable which forms part of the final circuit.

The present invention enables the assembly process to be simplified while ensuring that a desired electrical pathway will be achieved. It also enables the test procedure to be simplified.

In essence, the invention provides a distribution frame arrangement and a connector and conductor wire sub-assembly in which, because the sub-assembly is preformed and the distribution frame constructed to receive the preformed sub-assembly, there is a simplification in the final assembly of distribution frame, connector and conductor wires together.

According to one aspect of the present invention, a distribution frame arrangement is provided having a plurality of mounting means for detachably holding a plurality of cross-connect connectors in predetermined locations, and an attachment region for attachment of at least one multiple contact connector, the arrangement defining access for passage for electrical wiring from said location to said region.

With the use of the above frame arrangement, electrical wiring is connected from one row of terminals of a cross-connect connector to the multiple contact connector. Hence, a test procedure may be followed which excludes incoming and outgoing cables. In this procedure, with conductor wires extending from one row of terminals of the cross-connect connector to the multiple contact connector, test equipment is connected at one side directly to the other row of terminals of the cross-connect connector. At its other side, the test equipment is electrically connected to a mating connector for the multiple contact connector, the two connectors then being assembled.

In one convenient arrangement with a unitary frame, a plurality of the mounting means are preferably provided for holding a plurality of cross-connect connectors in substantially parallel and side-by-side opposing relationship with the mounting means for different connectors spaced apart in a direction from end-to-end of the frame. The attachment region in this arrangement is disposed towards one end of the frame and separated from the other end by the mounting means. In a specific construction, the locations for the cross-connect connectors are disposed in tiered fashion one above another.

In other convenient arrangements which may have single frames, the mounting means is provided to hold two cross-connect connectors. The attachment region may be provided for attachment of one multiple contact connector. Alternatively, two attachment regions are provided, each for attachment of one multiple contact connector. These attachment regions may be spaced apart by the two predetermined locations for the cross-connect connectors.

The invention also includes a connector and electrical conductor wiring assembly comprising a cross-connect connector having a dielectric body with two spaced rows of electrical terminals held by the body, the terminals of one row being electrically connected through the body with terminals of the other row, a plurality of insulated electrical conductor wires electrically connected, each by one end, to terminals of one row of the cross-connect connector, and a multiple contact connector having a plurality of terminals, the conductor wires connected, each by its end, to the terminals of said multiple contact connector.

The connector and wiring assembly according to the invention may be assembled either manually or at least partly by assembly apparatus in a factory environment. This will thereby serve two useful functions. One of these functions is to decrease the time and effort spent in assembly wiring to the cross-connect connector when this is mounted upon the distribution frame arrangement. Also in a factory environment, such an assembly may be made faster than upon the distribution frame itself. As the other function, connecting the cross-connect connector to one of the incoming and outgoing cables may also be avoided. This simplifies the assembly operation for the complete distribution system. Normally, an incoming or outgoing cable needs to have its jacket and sheath removed to expose sufficient lengths of conductor wires for them to extend through the frame to the various positions for attachment to their respective cross-connect connectors. For this purpose also, the conductor wires must be grouped with each group going to a specific location. The use of the assembly of the invention avoids the need for this part of the assembly process. As a result, the removed length of a jacket and sheath of one of the cables to the frame arrangement need only be sufficient to expose insulated conductors for connection to complementary parts of the disconnectible connector.

The invention also includes a distribution frame arrangement and wiring assembly comprising: a distribution frame arrangement having at least one mounting means for detachably holding a cross-connect connector in a predetermined location; a cross-connect connector for mounting in said mounting means, said cross-connect connector having a dielectric body with two spaced rows of electrical terminals held by the body with terminals of one row electrically connected through the body with terminals of the other row; a plurality of insulated electrical conductor wires electrically connected, each by one end, to terminals of one of the rows of said cross-connect connector; and a multiple contact connector, said multiple contact connector attached to an attachment region of the distribution frame arrangement; said insulated conductor wires extending from said cross-connect connector, through the frame arrangement and being electrically connected, each by their ends, to said multiple contact connector and so as to permit the cross-connect connector to be mounted in said mounting means.

The invention further includes a distribution frame arrangement and wiring assembly as defined in the last preceding paragraph and also including an incoming or outgoing cable having insulated conductor wires electrically connected to a mating connector, for the multiple contact connector.

Embodiments of the invention will now be described, by way of example, with reference to the accompanying drawings, in which:

FIG. 16 is a view similar to FIG. 15 showing wiring to access assemblies incorporating distribution frame arrangements and wiring assemblies according to both the third and four embodiments; and FIG. 17 is a circuit diagram showing the use of a distribution frame and wiring assembly according to the fourth embodiment installed in a customer's priviate network.

Figure 1:
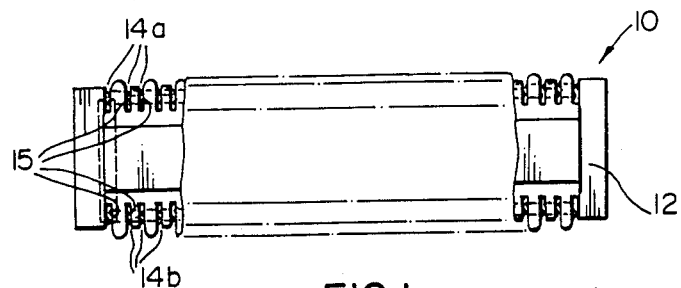
FIG. 1 is a plan view of a prior art cross-connect connector.

As shown in FIG. 1, a prior cross-connect connector 10 comprises a substantially planar strip shaped body 12 of dielectric material having along each edge a row of terminals 14a and 14b. In this known connector structure, each of the terminals comprises two opposed electrically conductive portions (not shown) arranged on either side of a molded groove 15 in an edge of the body 12. These conductor portions act to cut into insulating material surrounding a conductor wire when the conductor wire is forced into the groove so that the conductor portions electrically contact the conductor wire. Such terminals are normally referred to as insulation displacement terminals. This cross-connect connector structure is used for the distribution of electrical wiring to access points and terminals within a customer's premises. In this structure, one row of terminals e.g. terminals 14a, are connected to conductor wires of one cable or group of cables and the other row of terminals, e.g. terminals 14b, are connected to another cable or group.

Figure 2:
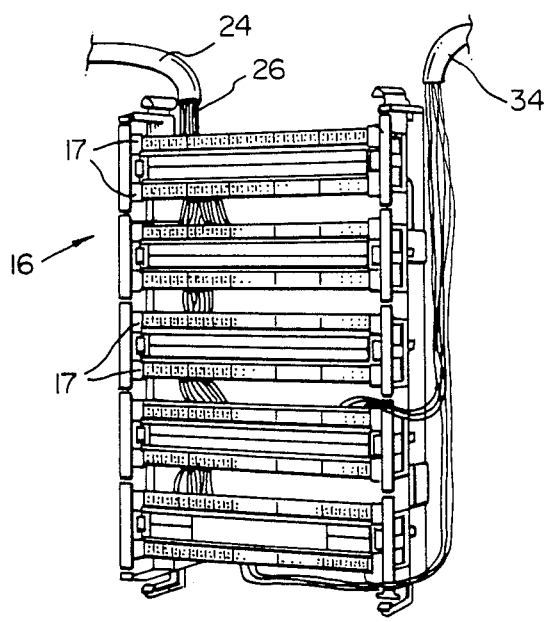
FIG. 2 is an isometric view of a distribution frame and wiring assembly according to the prior art.
Figure 3:
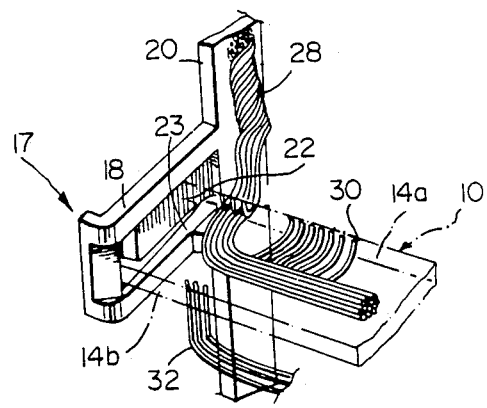
FIG. 3 is an isometric view, on a larger scale, of part of the assembly of FIG. 2 to show wiring to a cross-connect connector.
Figure 4:
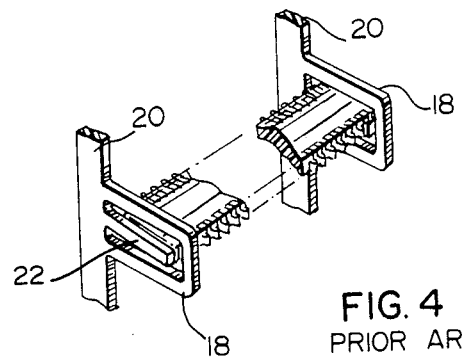
FIG. 4 is an isometric view in the opposite direction from FIG. 3 and showing one prior art mounting means of a distribution frame.

The cross-connect connector 10 shown in FIG. 1 is normally used in a prior art distribution frame arrangement and wiring assembly an example of which is shown in FIG. 2. A distribution frame arrangement and wiring assembly for instance as shown in FIG. 2, comprises a distribution frame 16 having substantially planar main frame structure and a plurality of mounting means 17 for detachably holding a plurality of cross-connect connector 10 in predetermined locations. The distribution frame 16 is typical in having ten mounting means 17 each of which comprises a pair of horizontally spaced latches 18 integrally carried by a vertical carrier 20. A latch 18 of each device is resiliently held by the carrier as shown by FIGS. 3 and 4. The latches in an unstrained condition project forwardly and parallel and are spaced horizontally apart a distance sufficient to enable the associated cross-connect connector 10 to be located horizontally with its ends within slots in the latches and engaging stops 22 outside the slots. The latches are resiliently moved apart to allow a connector 10 to be located between them. Cross-connect connectors therefore normally extend horizontally in a tiered fashion, i.e. one connector above another. In the finished assembly of the distribution frame and wiring according to the prior art, an incoming cable 24 has its insulated conductor wires 26 separated into groups and these groups are passed to the cross-connect connectors, one group to each connector. As may be seen from FIG. 3, each group 28 of insulated conductor wires passes beneath the associated cross-connect connector with the ends 30 of the conductor wires extending in succession away from the group to be held within the terminals of the row which lies at the back edge of the connector, e.g. row 14a. Other conductor wires 32 (FIG. 3) are connected to the terminals of the forward row 14b of the connector in the frame and these conductor wires 32 which may be separate or form part of an outgoing cable 34, extend to further equipment and/or terminal apparatus such as a telephone or a data processor.

Thus the conductor wires and their cables 24 and 34 are permanently attached to the connectors in the distribution frame. For the conductor wires to be connected to their respective terminals of the connectors 10 it is necessary for each connector to be already mounted in the distribution frame. This is effected in known manner, by locating the connectors initially in a reversed position from their normal operating position and then in their normal operating position to enable the conductor wire ends to be inserted into the terminals along each row in turn. For instance, if it is considered that in FIG. 3, terminal ends 30 are connected to the terminals 14a which lie towards the rear of each connector in its operating position, then initially the connector is located in its mounting with the row 14a of terminals facing forwardly. This enables the conductor wire ends 30 to be inserted in the terminals 14a with each group of wires extending across the top surface of the connector. The connector is then removed and turned about a longitudinal axis so that its row of terminals 14a faces towards the rear of the distribution frame as shown in FIG. 3 in which position the group of wires 28 lie beneath the connector. This movement then exposes the row 14b of terminals to the forward facing position as shown in FIG. 3 to enable the conductor wires 32 to be located within this row. Thus a lengthy assembly procedure of wire connectors and distribution frames is necessary and, because of the possible location of the incoming or outgoing cables and the location of the distribution frame, the making of the assembly may render the operation difficult for the assembler.

In addition to this, when the assembly has been completed as shown in FIG. 2, then it is necessary to perform a test to discover whether all of the conductor wire ends are conductively connected to their respective terminals. This test procedure will certainly involve the inclusion of the incoming cable 24 into the test circuitry and possibly also each outgoing wire or cable. This increases difficulties associated with the test procedure in that the test apparatus needs to be connected to terminals at the other ends of the cables which may be a considerable distance from the distribution frame. With the invention, however, the above disadvantages are avoided or minimized.

Figure 5:
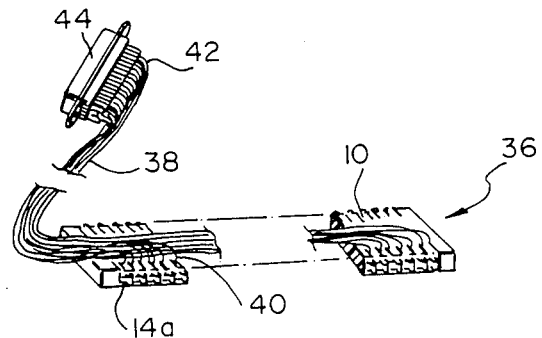
FIG. 5 is an isometric view of a cross-connect connector and electrical conductor wiring assembly according to a first embodiment.

In a first embodiment, as shown in FIG. 5, a preformed connector and electrical conductor wiring assembly 36 is shown. The assembly comprises a cross-connect connector 10 of the structure shown in FIG. 1. The connector 10 has a group 38 of insulated electrical conductor wires connected by their ends 40 to terminals of the row 14a with the group 38 passing along the uppermost surface of the connector. The other ends 42 of the conductor wires are electrically connected to a connector 44 having multiple contacts. As shown, this connector is commonly referred to as a "ribbon connector". The above assembly 36 is constructed separately from its assembly into a distribution frame and may be built in a convenient location either manually or by machinery.

Figure 6:
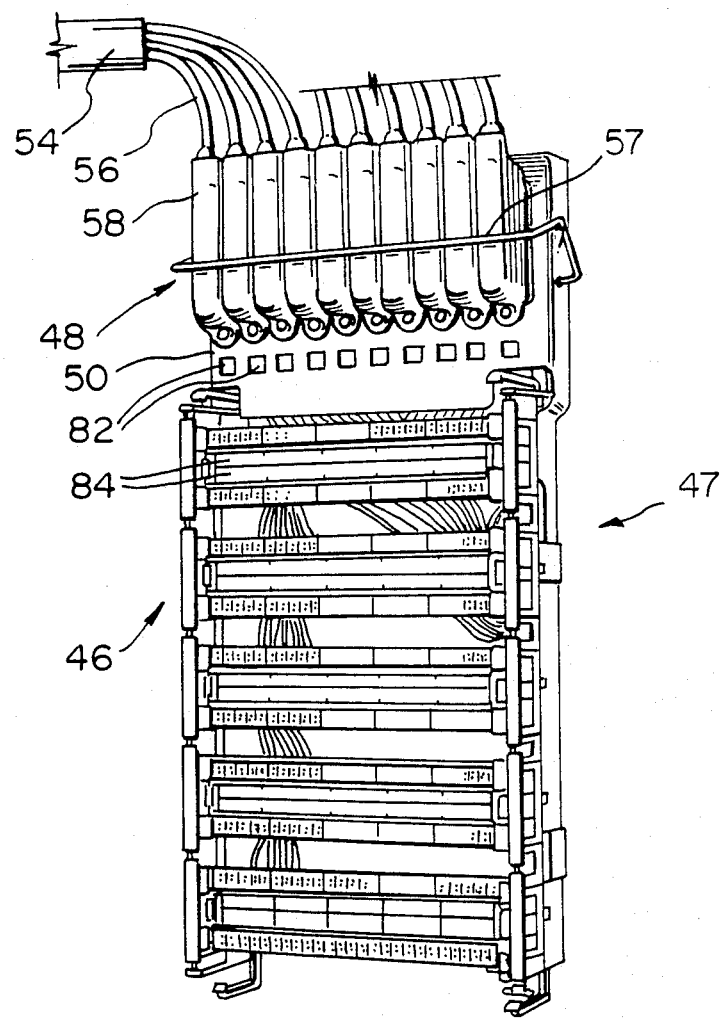
FIG. 6 is a view similar to FIG. 2 of a distribution frame and wiring assembly according to a second embodiment.
Figure 7:
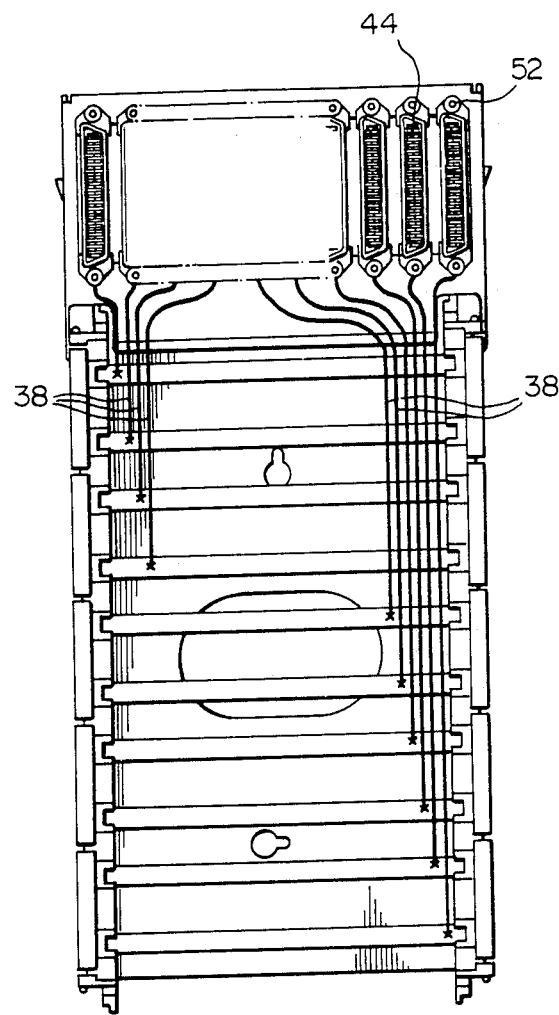
FIG. 7 is a front view on the assembly of FIG. 6 showing diagrammatically the positions of conductor wire bundles extending through the frame.

A plurality of assemblies 36 are mounted into a distribution frame 46 as shown in FIGS. 6 and 7 to form a distribution frame arrangement and wiring assembly 47 according to a second embodiment. The frame 46 is basically of the same construction as prior art frame 16 shown in FIGS. 2 and 3 and has the same design of mounting means for the connectors with the connectors in the same relative tiered positions. The frame 46 differs however from the prior art frame 16 in that it also has an attachment region 48 spaced from the locations for the cross-connect connectors 10, the region 48 being provided for attachment of the ribbon connectors 44 of the assemblies 36. This region 48 is provided by a panel 50 which is attached to the top of the distribution frame, i.e. above the tiered mountings for the connectors 10.

The cross-connect connectors 10 of the assemblies 36 are mounted in their respective positions in the frame 46 with the row 14a of terminals facing towards the back of the frame so that the group 38 of conductor wires in each case underlies the associated connector 10 in a similar manner to the prior art construction shown in FIG. 3. Each of the groups of conductor wires 38 then passes upwardly behind the conductors (as shown diagrammatically in FIG. 7) to the rear of the panel 50 so that the associated ribbon connectors 44 are enabled to pass through holes in the panel and are attached by attachment screws 52 to the panel in their respective side-by-side positions as shown in FIGS. 6 and 7. This assembly procedure, i.e. by providing preformed assemblies 36 and then attaching these assemblies into the distribution frame to form the completed frame and wiring assembly, avoids the necessity of having to connect one side of the connectors 10 to the incoming wires in the presence of the distribution frame. Hence, the assemblies 36 may be made in a more convenient location either manually or by machinery means. In fact the assemblies 36 may be made whenever convenient and may be stored for future assembly into distribution frames. As this is the case, it will be realized that the assembly of the assemblies 36 onto the frame 46 is much simpler than has previously been the case with prior art assembly arrangements.

The use of assemblies 36 also simplifies and eases the attachment of incoming and outgoing cables to the distribution frame. For instance, in the second embodiment as shown in FIG. 6, the incoming cable 54 has its conductor wires formed into appropriate wiring groups 56 which are electrically attached to the mating connectors 58 for the ribbon connectors 44. As can be seen, the attachment of the mating connectors 58 to the cable 54 may be made simpler and easier by attaching the connectors 58 with a cable hanging in a position easily accessible to an assembler. The cable may then be located in its final position for the connectors 58 to be electrically mounted into the ribbon connectors 44 to give the finished construction shown in FIG. 6. Thus the difficulty in providing the conductor wiring groups in the appropriate lengths to reach down to the associated cross-connect connectors 10 in the distributor frame is avoided, together with the difficulty in passing these groups from the already mounted cable down the back of the distribution frame and connecting them to their appropriate connectors 10.

Figure 8:
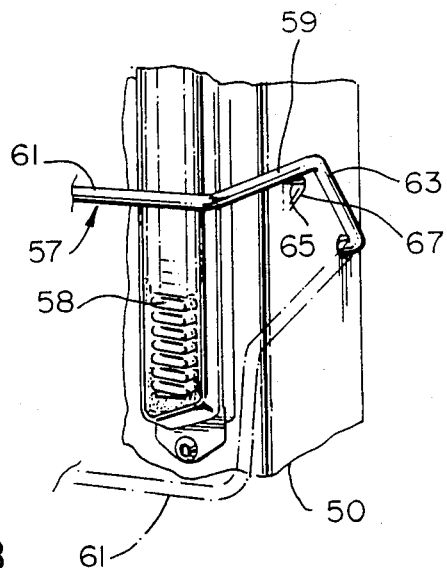
FIG. 8 is an isometric view of part of the assembly of FIG. 6 and on a larger scale.

Further, the panel 50 is provided with a single means for holding the mating connectors assembled to the ribbon connectors and which operates with all of the mating connectors so as to avoid inconvenient-to-operate holding means normally used on each mating connector. This holding means comprises a holding bar 57 which has a central horizontal section 61 and two mutually parallel end arms 59. As shown in FIG. 8, ends 63 of the arms turn inwards and are pivotally mounted through apertures in sides of the panel 50 so that the arms extend forwardly of their pivotal positions to locate the horizontal section 61 across the front of the panel. The bar 57 is pivotal from a lower or release position of section 61, shown chain-dotted in FIG. 8, to an upper full outline position in which section 61 engages across all of the mating connectors 58 to hold them assembled ribbon connectors 44. The arms are crooked to ensure the horizontal section 61 is disposed higher than the pivotal position when the section 61 moves inwards towards the connector parts 58 so as to engage them. The holding means also includes abutment means to normally hold the bar with the section 61 in the holding position. This abutment means comprises an inwardly facing abutment 65 in each side of panel 50 to engage beneath an arm and prevent its downward movement. Each abutment 65 is formed as a pressing in its side of the panel, this pressing also producing a convex surface 67 extending upwardly and inclined outwardly from the panel side to the abutment. The arms 59 are resiliently movable in a direction away from each other. In moving the bar from its lower position to its holding position, the arms engage the convex surfaces 67 and are progressively flexed apart until they move beyond these surfaces. The arms then return resiliently inwards towards the panel sides to be supported by the abutments. To release the bar and return it to its lower position, the arms are manually flexed apart to enable them to move over the surfaces 67.

With the use of panel 50, it is a simple matter to visually associate each of the ribbon connectors with its appropriate cross-connect connector. This is easily done by locating colored markers or numbered markers 82, for instance, beneath each of the ribbon connectors. A similarly colored panel or numbered panel 84 is placed horizontally above or below the appropriate cross-connect connector as shown in FIG. 6.

In addition to the above advantages, the present invention provides a further advantage. This advantage concerns testing of the finished assembly. Testing to indicate whether each conductor wire is connected properly into its terminal and may proceed without passing a current through the conductor cable 54. In other words, before the mating connectors 58 are connected to the ribbon connectors 44, a test apparatus (not shown) is easily connected through the circuitry provided on the panel by providing one end of the test equipment with a mating connector 58 and inserting it in succession into each of the ribbon connectors 44, and having another part of the test apparatus with connections for inserting into each of the terminals 14a of the connectors 10. Thus the test circuit is created in each case from the test equipment, through the appropriate ribbon connector 44, along the wires of each wiring group 38, and through each cross-connect connector 10 and back into the test equipment.

Figure 9:
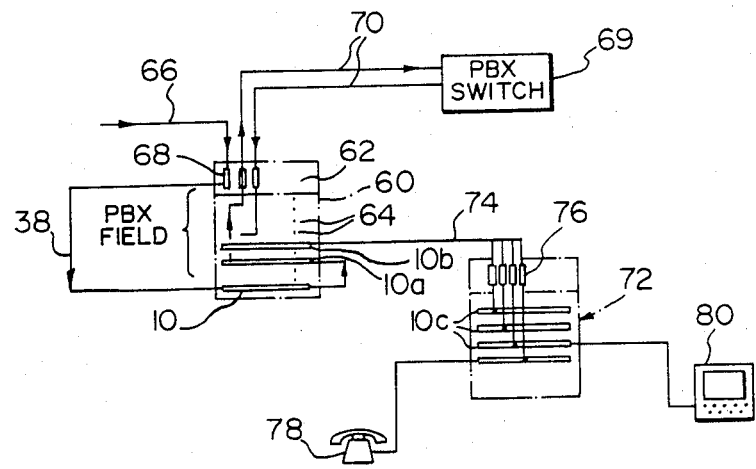
FIG. 9 is a circuit diagram including distribution frame and wiring assemblies which are modifications of the assembly of the second embodiment.

Assemblies 36 may be used in various ways and their use is not limited to connection with the incoming cable. For instance, as shown diagrammatically in a circuit diagram in FIG. 9, in a modified arrangement of the distribution frame and wiring assembly 47 of the second embodiment, a distribution frame 60 (chain-dotted outline) has a panel 62 at the top of the frame for location of ribbon connectors. Below this are disposed locations 64 for the cross-connect connectors 10. In the Figure, only sufficient of the cross-connect connectors 10 are shown to enable this modified arrangement to be indicated. In this embodiment, an incoming cable 66 has all of its conductors connected to a mating connector of one ribbon connector 44. The ribbon connector forms part of an assembly 36 which includes the lowest cross-connect connector 10 and associated wires 38. The group of wires 38 from this assembly are connected to the rearward facing row of terminals of the connector 10 at the lower end of the frame 60. The forward facing row of terminals are connected, as shown, to the forward facing terminals of another connector 10a above the connector 10. The connector 10a and other connectors such as 10b, are in a private branch exchange field and are connected to the private branch exchange switch 69. In each case, the connector 10a or 10b forms part of an assembly 36 (see FIG. 5) with its group of wires 38 connected to a ribbon connector 44 which is also carried in the panel 62 of the frame. Each of these connectors 44 is in turn connected by a cable 70 to the switch 69.

The connector 10 is thereby connected through the connector 10a with the switch 69 and the or each of the connectors 10b is connected by its forwardly facing row of elements with a connector 10c mounted in a further distribution frame or frames 72. Each connector 10b has its forwardly facing row of elements joined by a group of conductor wires 74 with a mating connector 76 of at least one ribbon connector 44, the connector 44 being carried by the distribution frame 72. It is therefore possible for each of the connectors 10b to be pre-assembled with its groups of conductor wires 38 and 74 and an appropriate ribbon connector or mating connector at the other end of each wire group. In each case, a cross-connect connector 10c forms an assembly 36 together with its group of wires 38 to the appropriate ribbon connector 44. Forwardly facing rows of elements of the connectors 10c are in turn connected to user terminals, such as a telephone 78 and a screen terminal 80, or other appropriate equipment.

The invention is also particularly useful for connecting an incoming cable, such as a trunk cable from the public network, to a customer's private network.

Figure 10:
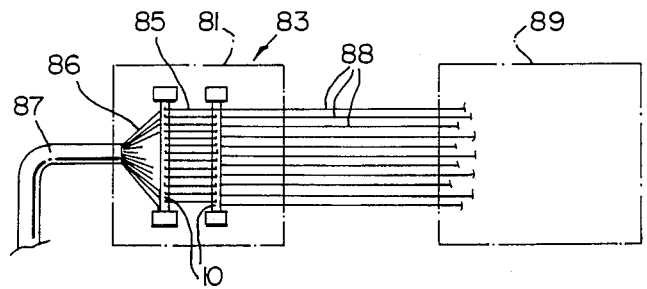
FIG. 10 is a circuit diagram of a prior art connection of an incoming cable to a private network through an access housing of the incoming cable.

In an existing arrangement for connecting a trunk cable to a customer's private network, as shown by FIG. 10, two prior cross-connect connectors 10 located in parallel and spaced positions within an access housing 81 of an access assembly 83, have their forwardly facing row of elements connected together, from one connector 10 to the other, by individual insulated conductor wires 85. The rear facing row of terminals of the one connector 10 is connected to the incoming wires 86 of the trunk cable 87. The rear facing row of terminals of the other connector 10 is electrically connected to outgoing wires 88 which connect the trunk cable with the private network 89, shown diagrammatically in chain-dotted outline.

As can be seen with the prior arrangement, similar problems exist with regard to joining the connectors 10 to the wires as are found with connecting wires into connectors in distribution frames with regard to FIGS. 1 and 2.

With the present invention however, these problems are minimized.

Figure 11:
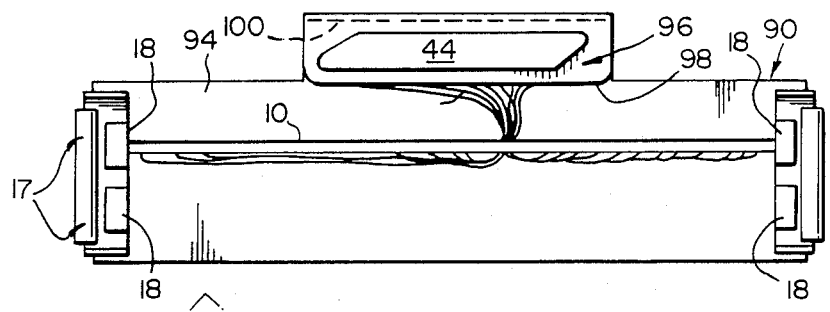
FIG. 11 is a front view of a distribution frame and wiring assembly according to a third embodiment.
Figure 12:
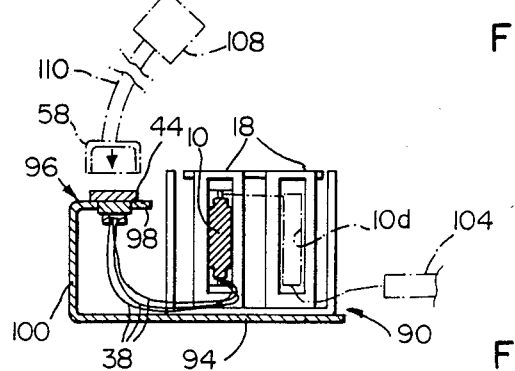
FIG. 12 is a cross-sectional view of the assembly of the third embodiment, taken along line XII—XII in FIG. 11.

In a third embodiment as shown in FIGS. 11 and 12, a distribution frame arrangement and wiring assembly 90 comprises a distribution frame 92 having a rectangular back panel 94. The back panel 94 carries two mounting means 17 each comprising a pair of horizontally spaced latches as described with reference to FIGS. 2, 3 and 4. The mounting means 17 may thus hold two prior cross-connect connectors 10 and 10d (in chain-dotted outline in FIGS. 11 and 12) in spaced relationship on the distribution frame 92.

In the structure of FIGS. 11 and 12, a single attachment region 96 is provided for holding a ribbon connector 44 of similar structure to that described in the second embodiment. The ribbon connector 44 is carried upon a flange 98 which lies parallel to the back plate 92 and is spaced from it by a right-angle plate portion 100.

In the distribution frame and wiring assembly shown particularly by FIG. 12, the ribbon connector 44 and the connector 10 form parts of a preformed connector and electrical conductor wiring assembly 36 as described in the first embodiment. The ribbon connector 44 has its rearward facing terminals connected by insulated conductor wires 38 with the rearward facing row of terminals of connector 10. The assembly 36 is mounted into the distribution frame 92 to provide the frame arrangement and wiring assembly 90 which may be kept in storage prior to use as part of an access assembly. The connector 10d is not part of assembly 90, but is added when making an access assembly as is described below.

Because the distribution frame and wiring assembly comprises a preformed connector and electrical conductor wiring assembly 36 as described in the first embodiment, the assembly 90 may therefore be pre-assembled and ready for use with the connector 10 and connector 44 in position thereby reducing the time and difficulty in connecting the trunk cable with the private network. In this particular arrangement as shown, the assembly 90 is installed in a suitable position and the second connector 10d is electrically suitable position and the second connector 10d is electrically connected by its rear facing row of terminals to the trunk cable 102 and before being correctly located by its mounting means 17. The two connectors 10 and 10d are then connected by wires 106 (chain-dotted in FIGS. 11 and 12) bridging the front facing rows of terminals of the connectors. The joining of the trunk cable to the connector 10d and of the two connectors together does not differ from that in prior constructions. However with the assembly 90, the joining of the connector 10 to the private network is considerably simplified. As can be seen, the connector 10 is joined directly to the ribbon connector 44 and a mating connector 58, which is connected by an inside cable 110 to the private network 108 (chain-dotted outline in FIG. 12), is simply connected to the ribbon connector 44.

Figure 13:
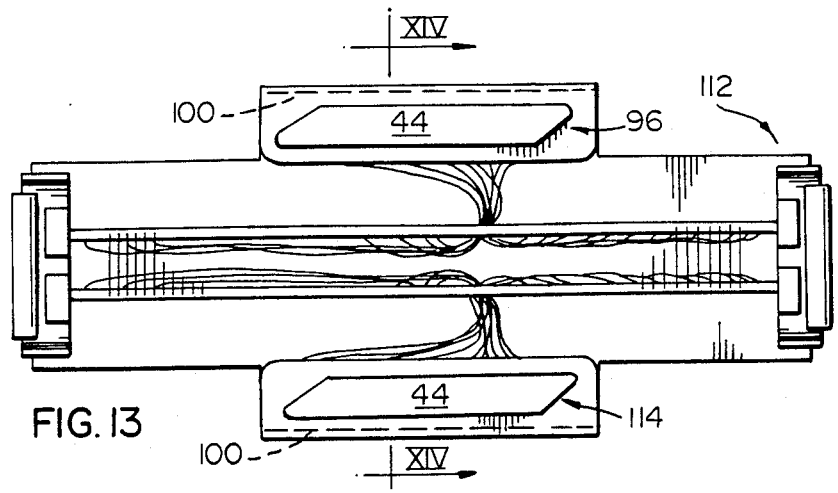
FIG. 13 is a front view of a distribution frame and wiring assembly according to a fourth embodiment.
Figure 14:
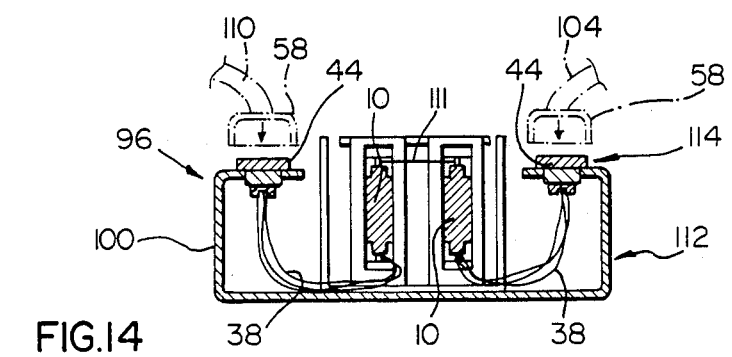
FIG. 14 is a cross-sectional view of the assembly of the fourth embodiment, taken along line XIV—XIV in FIG. 13.

In a fourth embodiment as shown by FIGS. 13 and 14, a distribution frame and wiring assembly 112 is of the same construction as that described in the third embodiment except that in the fourth embodiment, two attachment regions 96 and 114 are provided. Both attachment regions 96 and 114 carry a ribbon connector 44.

The connectors 44 comprise parts of two preformed connector and electrical conductor wiring assemblies 36 as described in the first embodiment. The assembly 112 is pre-built with the two connectors 44 installed and electrically connected together by insulated conductor wiring 38 extending to respective cross-connect connectors 10 and bridging wires 111 between the connectors 10. The assembly 112 may be stored ready for use.

In use of the structure shown in FIGS. 13 and 14, with the assembly 112 disposed in a suitable position, it is a simple matter to connect the incoming and outgoing cables 104 and 110 together by attaching mating connectors 58 to the respective ribbon connectors 44.

The structures of the third and fourth embodiments may be used in an extremely satisfactory manner to overcome problems associated with connecting incoming trunk cables with the customer's private network.

Figure 15:
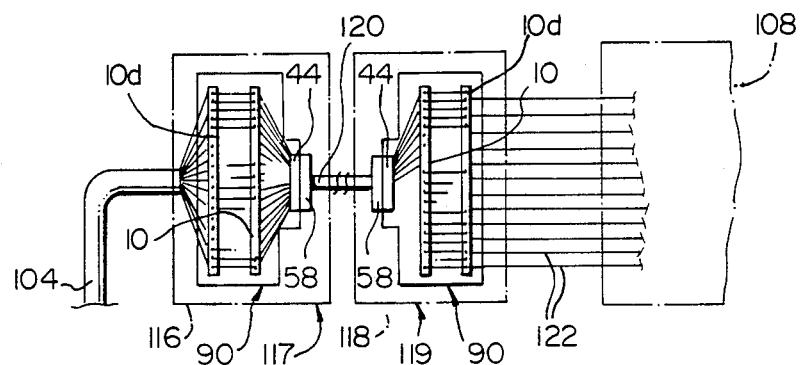
FIG. 15 is a circuit diagram including assemblies according to both the third and fourth embodiments.

For instance as shown in FIG. 15, two assemblies 90 are arranged in series in main and secondary access housings 116 and 118 of access assemblies 117 and 119 with their ribbon connectors 44 joined by mating connectors 58 and interconnecting cable 120 extending between the housings 116 and 118. The trunk cable 104 is joined to the cross-connect connector 10d of the one assembly 90 while the other cross-connect connector 10d is joined by individual conductor wires 122 into the private network 108.

The above circuit of FIG. 15 has the advantage that if it is required to test either the incoming trunk cable or the customer network for faults, it is a simple matter to separate the two parts of the circuit by disconnecting the ribbon connector in access housing 118 which is a personal test access for the customer on the private network side of the cable 120.

In use, if the customer requires to test his network for faults, he merely has to disconnect the cable 120 within his access block 118. Thus he may proceed with testing his network without interfering in any way with the electrical connections within the block 124.

In an alternative circuit shown in FIG. 16, and having the advantages of the structure in FIG. 15, access assembly 124 contains both an assembly 90 and an assembly 112 within housing 123. The trunk cable 125 is connected into the assembly 90 in the manner described with regard to FIGS. 11 and 12 and the ribbon connector of the assembly 90 is joined to the assembly 112 in this block by cable 126.

In this structure, the customer has his personal test access assembly 128 which includes assemblies 90 and 112 joined in series by a cable 126 within housing 129. The cross-connect connector 10d of the assembly 90 in the assembly 128 is joined by individual insulated wires 130 to the private network 108. The two access assemblies 124 and 128 are connected together by a cable 132 having mating connectors 58 which electrically connect the ribbon connectors 44 of the two assemblies 96.

In a further circuitry arrangement shown in FIG. 17, the assembly 112 shown in FIGS. 13 and 14 may be used to electrically connect two parts 134 and 136 of a private network. As can be seen from FIG. 17, the preformed assembly 112 is located in position and is simply connected to the two circuitry parts 134 and 136 by the use of mating connectors 58. If it is desirable to test either part of the circuitry, it is a simple matter to disconnect the parts 134 and 136 by simply disconnecting one of the mating connectors from its ribbon connector.

It can be seen therefore that with the use of the present invention, the assembly of cross-connect connectors, wires and cables into distribution frames simplifies the interconnection of cables with distribution frames and from one distribution frame to another and also to further equipment. This also provides convenience for manufacture especially in a situation where a great deal of the assembly can be preformed, such as the cross-connect connectors with wires and ribbon connectors.

What is claimed is:

1. A distribution frame comprising:

a substantially planar main frame structure having a front;

a plurality of pairs of mounting means carried by one region of the structure, the mounting means extending forwardly of the structure and each pair comprising two spaced latches for holding between them a cross-connect connector in a position forwardly of the main frame structure;

another region of the structure formed with mounting apertures for securing multiple contact connectors to the structure with the multiple contact connectors facing forwardly of the structure for attachment to them of mating connectors at the front of the structure, the mounting apertures lying spaced apart side-by-side in a row; and a holding bar for the mating connectors, the holding bar having a connector holding portion located across the front of the frame structure and two end arms extending at an angle to the holding portion, the holding bar pivotally mounted to the frame structure by pivotal reception of the end arms into the frame structure so as to move the connector holding portion into and out of a mating connector holding position directly in front of and spaced from the apertures.

2. A frame according to claim 1 including abutment means on the frame structure, the abutment means during movement of the bar into the holding position, resiliently moving the end arms away from one another until they pass over the abutment means and resiliently return towards each other so that the abutment means normally holds the bar in the holding position.

3. A distribution frame assembly comprising:

a substantially planar main frame structure having a front;

a plurality of pairs of mounting means carried by one region of the structure, the mounting means extending forwardly of the structure and each pair comprising two spaced mounting latches;

a plurality of cross-connect connectors held by the pairs of mounting latches, one cross-connect connector between the mounting latches of each pair with each cross-connect connector held spaced forwardly from the front of the main frame structure and having two rows of insulation displacement terminals with one row facing rearwardly and the other row facing forwardly of the connector;

a plurality of multiple contact connectors mounted side-by-side in a row through apertures in another region of the main frame structure, the multiple contact connectors facing forwardly of the structure for attachment to them of mating connectors at the front of the structure, the multiple contact connectors interconnected to the rearwardly facing rows of insulation displacement terminals of the cross-connect connector by insulated electrical conductors extending from the rear of the multiple contact connectors; and a holding bar for retaining the mating connectors connected to the multiple contact connectors, the holding bar having a connector holding portion located across the front of the frame structure and two end arms extending at an angle to the holding portion, the holding bar pivotally mounted to the frame structure by pivotal reception of the end arms into the frame structure so as to move the connector holding portion into and out of a mating connector holding position in which the holding portion is disposed across the front of the frame structure and spaced from the multiple contact connectors so as to engage and hold the mating connectors in position when the mating connectors are electrically connected to the multiple contact connectors.

* * * * *